April 12, 1927. 1,624,904
C. CLAUS
METHOD OF AND APPARATUS FOR FORMING BODIES BY PRESSURE
Filed Jan. 20, 1925 2 Sheets-Sheet 1
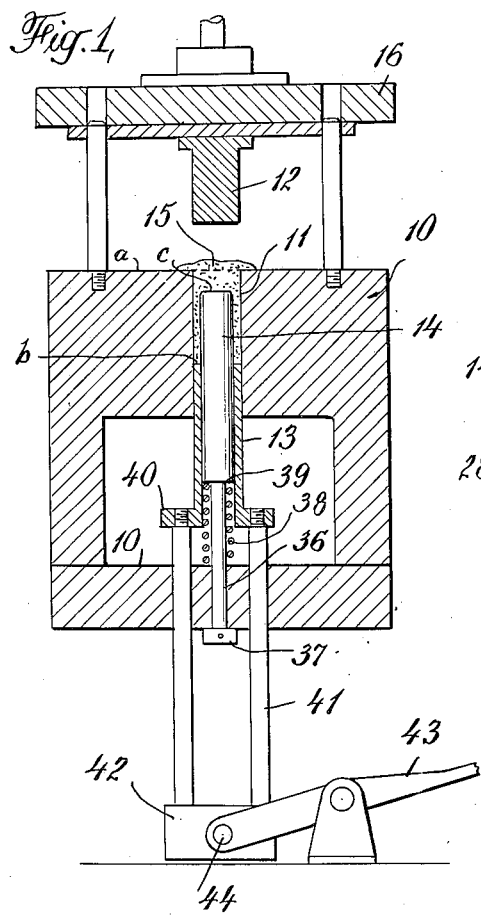
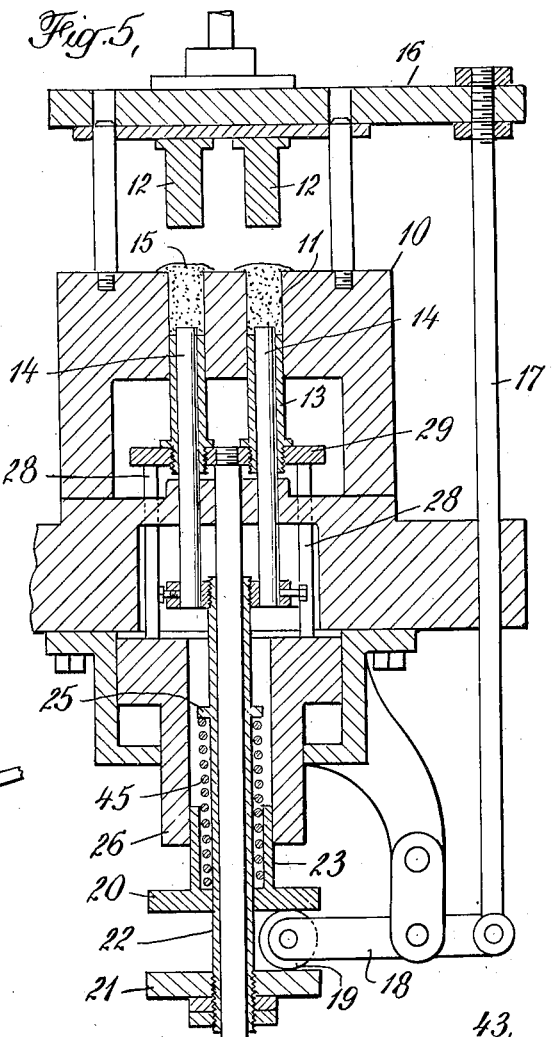
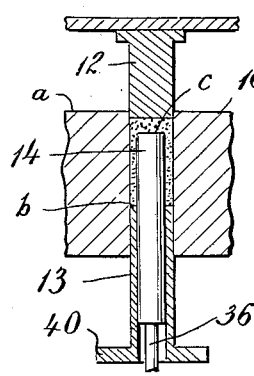
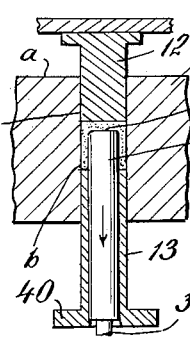
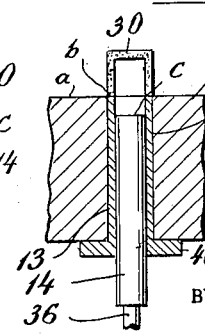
INVENTOR
Carl Claus
BY Willis Fowler
ATTORNEY

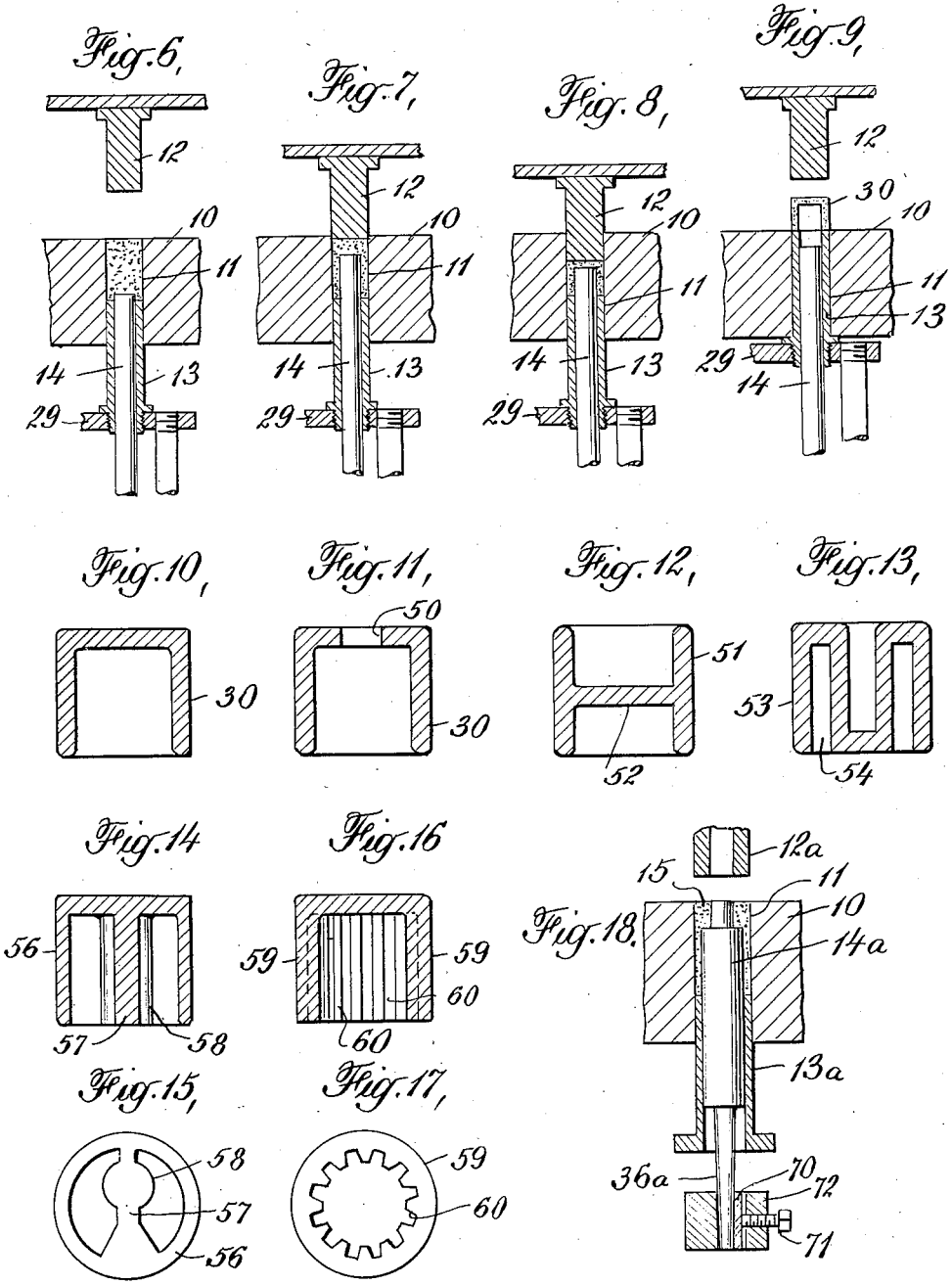

Patented Apr. 12, 1927.

1,624,904

UNITED STATES PATENT OFFICE.

CARL CLAUS, OF PLAINFIELD, NEW JERSEY, ASSIGNOR TO BOUND BROOK OIL-LESS BEARING COMPANY, OF BOUNDBROOK, NEW JERSEY, A CORPORATION OF NEW JERSEY.

METHOD OF AND APPARATUS FOR FORMING BODIES BY PRESSURE.

Application filed January 20, 1925. Serial No. 3,565.

My inventions relate generally to methods of and machines for making compressed articles or bodies, and in the present application thereof, my improvements are especially applicable in the use of dies or compressing means acting under pressure upon a charge or mass of compressible material and particularly when the material is in the form of a mixture of powdered or granulated substances, such for example, as the various well-known mixtures of powdered metallic and lubricating ingredients, which have been heretofore used in so-called oil-less bearings, or bearings of a porous nature capable of absorbing lubricants, though my present improvements are not limited to this class of articles, and have many different applications and uses, as will be hereinafter pointed out.

The method and the construction of the machines herein illustrated and described are of a kindred nature to those disclosed in my prior application for U. S. Letters Patent, filed October 26, 1923, Serial No. 671,032, and the present application is in part a continuation of my said prior application to which reference may be had in connection herewith. In said prior application, there is disclosed, among other things, the formation of open-ended tubular bodies or bearings, by compressing in dies a charge of powdered or granulated material and using pressure which is exerted with substantially equal force upon all the areas, dimensions or sections of the same, so that all parts of the product are compressed alike by equally acting forces. In cases, however, where the pressed out body is of an irregular shape or form, or has a part or member projecting laterally and inwardly from the main part, or is recessed, such for example as an interior flange on a tubular body, or a cup-shaped body or article, there is present the peculiar condition of a varying quantity, dimension or thickness of material in the direction in which the pressing force is exerted in the action of the dies. If in operating the mechanism of said prior application, I desired to form a tubular body having an internal flange or a transverse partition, I find it necessary to modify the same so that the part of the dies which operates interiorly of the material functions in such manner as to absorb part of the force by slightly yielding to compensate for the thinness of material at such places and thereby prevent the material from receiving all its required compression before the thicker places are sufficiently compressed; otherwise the press would stop because of the thin part being made solid before the thicker part is sufficiently compressed. This inequality is due to the fact that powdered material under pressure does not act like a liquid or plastic material which spread and fill a closed container with equal pressure in all directions, when pressure is applied at one place. I therefore use differential resistance so that differences in force come into play and thereby secure the desired effects by such differences and produce the desired article of uniform texture and coherency and with its various parts equally dense and firm and of substantially the same hardness, strength and durability. In carrying out my inventions, in order to obtain the difference in resistance for the different parts and regulate the same, I use movable parts in such places where excessive compression would occur and have these movable parts yield, while other parts remain fixed and practically non-yielding, in order to balance the action and thereby obtain a uniform compression throughout.

This application is a companion application of an application for U. S. Letters Patent Serial No. 3564 executed and filed by me on even date herewith and reference may be had to the same in connection herewith as they have subject-matter in common.

While there are various different ways of accomplishing the required variation in pressure at the different desired places of the charge or blank material, I herewith show different ways of utilizing spring mounted means for the purpose and have illustrated types of the same in the accompanying drawings, wherein:—

Fig. 1, shows in vertical section a machine embodying my invention and with the parts thereof in the positions assumed by them when the mold or die is charged with the material prior to the pressing operation.

Fig. 2, is a similar view of parts of the machine shown in Fig. 1, with the upper die lowered into position of contact with the charge.

Fig. 3, is a similar view to Fig. 2, with the upper die moved to its lowermost position wherein it has compressed the charge to its limit and with the auxiliary spring mounted means depressed to its limit.

Fig. 4, is a similar view to Fig. 3, showing the upper die raised and the lower die or mold part moved upwardly to eject the compressed product and with the auxiliary spring member restored to normal position, after the pressing force is removed.

Fig. 5, is a vertical sectional view of a machine like that shown in my co-pending application mentioned hereinabove, and which is equipped with my present improvements.

Figs. 6 to 9, inclusive, are vertical sectional views of parts of the machine showing the different stages of the compressing operation and the ejection of the compressed body.

Figs. 10 to 17, show on an enlarged scale, different forms of the article which may be produced in my improved machine.

Fig. 18, is a vertical sectional view of parts of the machine of modified form.

Referring to the drawings, 10 is a mold-member which is provided with a cylindrical mold or die chamber 11, which extends through the body of said member 10, and receives in its respective ends the annular die-member 13, and the solid die-member 12, the latter being forced downwardly therein and the former having an upward movement for ejecting the compressed body, or if preferred for pressing purposes. A cylindrical core-member 14 is arranged in the center of the die-member 13 with a sliding fit. The reduced lower end 35 of the core 14, slides in an opening or bearing 36, in the lower part of the mold-block 10 and is provided at its lower end with a fixed piece 37, which serves to limit the upward range of movement of the core. A helical spring 38, surrounds the stem 36, with the lower end thereof resisting on the fixed part of the mold-block 10 and the upper end engaging the lower end of the core at 39, and normally keeps the core forced upwardly to its highest position.

The lower die-member 13 is provided at its lower end with a fixed piece 40, to which are secured the rods 41, which reciprocate through openings in the mold-block 10, and are secured at their lower ends to a head or cross-member 42. A treadle 43, is pivoted at 44, to the head 42, and by means of the same, the lower die-member may be forced upwardly through the mold-chamber 11, to eject the finished body as indicated in Fig. 4. If preferred, the lower die-member may be forced upwardly in opposition to the downward movement of the upper die-member 12, during the compression of the material.

The reciprocating die carrier or head 16, to which the upper die 12 is secured, is operated by any suitable power and its descent causes the die to enter the upper end of the mold-chamber 11, and compress the charge from above and towards the lower die 13, which remains stationary during such compression, though it may be forced upwardly as the upper die descends and by the same power which actuates said upper die, if preferred.

With the parts in the relative positions shown in Fig. 1, a charge 15 of granular materials is placed in the apparatus so as to completely fill the annular space between the core or mandrel 14, and the chamber 11, and the space above the end of the core 14, which in this instance is made flat to serve as a bed or part against which the material is compressed. The surplus material is then scraped away leaving the charge about level with the surface of the mold-block 11, indicated by $a$. The upper die 12, is then forced down into contact with the charge, as indicated in Fig. 2, and its continued downward movement compresses the material against the lower die 13, which does not yield but offers a fixed resistance, and also compresses the material against the upper end of the core 14, which gradually yields under the force of the compression and thereby absorbs part of the force, so that by the time the shallow part of the material lying between the contacting end of the upper die 12, and the end of the core 14, indicated at $c$, is sufficiently compressed, the greater amount or depth of the material lying between the upper die 12 and the lower die 13, indicated at $b$, is also sufficiently compressed. In this way I succeed in controlling and regulating the density of all parts of the compressed material and obtain a product having substantially a uniform density.

When the compressing operation is finished, the upper die 12 is withdrawn, and then the upward movement of the lower die 13, by means of the treadle, carries the body 30, up to the level of the surface of the mold-block, as shown in Fig. 4, so that it can be quickly removed for another operation of the press. The core member 14 is then automatically raised by the action of its spring, as soon as the compressed body has been moved up for ejection.

In Fig. 5, I show the construction of machine contained in my said prior application for patent Serial No. 671,032, as being provided with my present improvements. This is accomplished by arranging a spring 45, around the sleeve 22, which is connected directly with the two core-members 14, with one end of the spring taken against the plate 20, and the other against a collar or abutment 46, fixed to the sleeve 22, and acting to normally keep the core members pressed to their upper limits of movement. The ends of the core members are made flat in order to serve as beds or parts against which the material is compressed in forming the interior parts or features of the recessed form of of articles for which this improvement is particularly adapted.

A vertically movable rod 17 connects the reciprocating head 16, with one end of a rocking arm 18 which carries at the other end a roller 19 bearing against the confronting surfaces of a pair of separated plates or abutment members 20 and 21. The lower abutment member 21 is rigidly connected to a sleeve 22 which is directly connected to the cores or mandrels 14 and the upper plate 20 has a limited sliding movement on the sleeve. Between the upper surface of the plate 20 and housed in an annular extension 23, is the spring 45, before referred to. The discharge or ejection of the compressed body 30, from the mold is effected through the operation of the foot-lever 31, which has a hinged connection at one end with a plunger 32, slidably mounted in the sleeve 22 and connected at its upper end to the plate 29 in which the lower die-members 13 are seated. It will be seen that the operation of the foot-lever lifts the plunger 32 and the plate 29 to thereby elevate the die-members to the ejecting positions.

There are many different forms of articles having cavities or recesses therein which may be made in accordance with my present improvements, in which the die part or member which cooperates in acting upon the interior or inner parts of the article is so constructed and arranged as to absorb part of the force used in compressing the material at such places. I have shown herewith several different forms of such articles. In Figs. 2 to 10, inclusive, is illustrated an ordinary cup-shaped device having a body part of tubular form with a bottom part closing one end. In Fig. 11, I show the same form of article having a central perforation 50, in the bottom part, and which formation is brought about by having the upper die and the core member provided with conforming parts, as shown in Fig. 18. Fig. 12, shows a hollow member 51, having a central partition 52. Fig. 13, shows a body 53 of cylindrical form with an interior annular groove 54, and a central recess 55, opening upon the opposite side or end from said groove. Fig. 14 shows a cup-shaped body 56, having an interiorly located part 57, formed with grooves 58. Fig. 15, shows a modification of the form in Fig. 14. Figs. 16 and 17 show the cup-shaped body 59, having teeth 60, upon its interior, extending longitudinally along its walls.

In Fig. 18, I show a modification of the means for causing the core-member 14ª, to yield gradually under the force of compression. Instead of using a spring, I employe a friction device comprising a block 70, carried in a collar 72, and whose pressure is regulated by a set-screw 71, so that the block may be made to bear with more or less force against the side of the stem 36ª, which tapers slightly downwardly. In this way the friction thrown upon the parts may be made to regulate the yielding capability of the core for the purposes herein described.

From the foregoing description, it will be understood that in my improvements I am able to control and regulate the density of the material undergoing compression, by means of certain means or dies which yield in part until the desired density has been obtained. This regulation is brought about by causing the compressing force to be absorbed or resisted in certain places by yielding means, while in other places there is a non-yielding resistance and no absorption by yielding means.

My present improvements may be equally well employed in the manufacture of articles other than bearings and from moldable or compressible material, for example, the ordinary articles or fixtures made from insulating material for electrical purposes. In making the so-called oil-less bushings, hereinabove referred to, I have used powdered materials, such as copper, zinc, tin and graphite, with lead added in some cases, and which has for some time been the well known practice. After compressing these articles in my improved machine, they are then heat treated to produce the desired consolidation of the particles and provide a coherent and unitary mass having the required hardness. After this heat treatment, the articles may be soaked in oil which will be taken up by the porosity of the material caused by the heating of the same. These articles are then sized in the usual way to finish them.

The various forms of the pressed articles which I have herewith illustrated comprise in the the main part a hollow cylindrical body so that in the formation of the same the compressing force is applied in the direction of the axial line of the bodies and which direction accords with that of the greatest thickness and also the lesser thickness,though with other forms which may be made in accordance with my invention, the pressing force may be applied in a non-axial direction.

I have made bearing bushings from a mixture of the granulated materials hereinabove referred to by the use of my improved method and machine. In some cases I have found that the granular material when finally compressed under the action of the dies, is about one-half the depth or dimension in both the thin and thick places, of the charge of material before compression.

Having thus described my invention, what

I claim and desire to secure by Letters Patent is:—

1. The method of producing from compressible material bodies having recesses, which consists in employing die members of which the recess forming part has a yielding capacity in the direction in which the force of compression is exerted while the main part is compressed between oppositely moving dies.

2. In apparatus for producing recessed bodies from compressible material, a mold-chamber having a core-member arranged axially therein with a space between the two and an annular die-member disposed in the bottom of said space against which the material is pressed, a die-member movable into and out of the outer end of said mold-chamber and acting to compress the material in said space and against said annular die-member and said core-member, said core-member being constructed and arranged to give or yield under the action of said material under compression.

3. In apparatus for producing recessed bodies from compressible material, a mold-chamber and a core-member arranged centrally therein with a space between the two and a die member disposed in the bottom of said space against which the material is compressed, said core-member being closed at its end where it is adapted to receive and support part of the material undergoing compression, a die-member movable into and out of the outer end of said mold-chamber and acting to compress the material around and upon said core-member which is mounted so as to yield under the compression of said material upon it.

4. In apparatus for producing recessed bodies from compressible material, a mold-chamber and a core-member arranged centrally therein with a space between the two, an annular die-member arranged in the inner part of said mold-chamber in the space around said core-member and vertically movable therein, an upper die-member movable into and out of the outer end of said mold-chamber and adapted to press the material in the space above and around said core-member and against the end thereof, said core-member being mounted so as to yield or give inwardly under the action of the compressed material thereon.

5. In apparatus for producing recessed bodies from compressible material, a mold-chamber and a core-member arranged within the same with a space between the two and with the upper end of said core-member lying below the upper end of said mold-chamber so as to receive and support charged material, a movable die-member within the lower end of said mold-chamber and surrounding said core-member, the said core-member being constructed and arranged to yield inwardly under the action of the material against it when compressed.

In testimony whereof, I have hereunto set my hand.

CARL CLAUS.